(12) United States Patent
Matsushima

(10) Patent No.: US 7,117,493 B2
(45) Date of Patent: Oct. 3, 2006

(54) IMAGE FORMATION SYSTEM, SOFTWARE ACQUISITION METHOD, AND COMPUTER PRODUCT

(75) Inventor: Hiroyuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 527 days.

(21) Appl. No.: 10/025,758

(22) Filed: Dec. 26, 2001

(65) Prior Publication Data

US 2002/0144257 A1 Oct. 3, 2002

(30) Foreign Application Priority Data

Mar. 28, 2001 (JP) ............................. 2001-094342

(51) Int. Cl.
G06F 9/44 (2006.01)
G06F 9/445 (2006.01)
G06F 7/04 (2006.01)
H04L 9/00 (2006.01)

(52) U.S. Cl. .................. 717/173; 717/178; 726/4; 713/155

(58) Field of Classification Search .................. 710/5; 717/171, 168, 172, 102, 174, 178; 719/327; 705/75; 358/1.13, 1.15; 700/83; 709/226; 713/161, 176, 182, 200
See application file for complete search history.

(56) References Cited

U.S. PATENT DOCUMENTS

| | | | |
|---|---|---|---|
| 5,933,584 A * | 8/1999 | Maniwa | ..... 358/1.15 |
| 6,314,565 B1 * | 11/2001 | Kenner et al. | ..... 717/171 |
| 6,591,151 B1 * | 7/2003 | Knopp et al. | ..... 700/83 |
| 6,748,538 B1 * | 6/2004 | Chan et al. | ..... 726/26 |
| 7,019,860 B1 * | 3/2006 | Matsushima | ..... 358/1.15 |
| 2001/0044857 A1 * | 11/2001 | Pham et al. | ..... 709/327 |
| 2002/0010684 A1 * | 1/2002 | Moskowitz | ..... 705/75 |
| 2002/0015180 A1 * | 2/2002 | Tominaga | ..... 358/1.15 |
| 2002/0026538 A1 * | 2/2002 | Takeo et al. | ..... 710/5 |

FOREIGN PATENT DOCUMENTS

| | | |
|---|---|---|
| JP | 7-93230 | 4/1995 |
| JP | 10-240540 | 9/1998 |
| JP | 11-212793 | 8/1999 |

OTHER PUBLICATIONS

The Java Virtual Machine Specification, by Tim Lindhold, and Frank Yellin, Addison-Wesley, 1997.*
U.S. Appl. No. 10/025,758, filed Dec. 26, 2001, Matsushima.
U.S. Appl. No. 10/650,715, filed Aug. 29, 2003, Matsushima.
U.S. Appl. No. 10/665,745, filed Sep. 22, 2003, Matsushima.
U.S. Appl. No. 10/795,394, filed Mar. 9, 2004, Morii et al.
U.S. Appl. No. 10/938,563, filed Sep. 13, 2004, Matsushima.

* cited by examiner

Primary Examiner—Wei Zhen
Assistant Examiner—Chih-Ching Chow
(74) Attorney, Agent, or Firm—Oblon, Spivak, McClelland, Maier & Neustadt, P.C.

(57) ABSTRACT

A multifunction machine selects a desired software component from a list of software components accumulated in a server, acquires the selected software component and authentication information from the server, and controls the processing operation of the software component based on the acquired authentication information.

24 Claims, 15 Drawing Sheets

FIG.5A http://www.ricoh.co.jp/component/comp_list.html
    HTML FILE INCLUDING THE LINK TO THE LIST OF COMPONENTS
http://www.ricoh.co.jp/component/comp_1.gw
    SOFTWARE COMPONENT 1
http://www.ricoh.co.jp/component/comp_1.aut
    AUTHENTICATION INFORMATION FOR THE SOFTWARE COMPONENT 1
http://www.ricoh.co.jp/component/comp2.gw
    SOFTWARE COMPONENT 2
http://www.ricoh.co.jp/component/comp2.aut
    AUTHENTICATION INFORMATION FOR THE SOFTWARE COMPONENT 2
:
:

FIG.5B

```
<html>
<head>
  <title>Software Component List</title>
</head>
<body>
  <h1>Component List</h1>
  <u1>
    <li><a href="comp1.gw">COMPONENT1</a>
    <li><a href="comp2.gw">COMPONENT2</a>
  </u1>
</body>
</html>
```

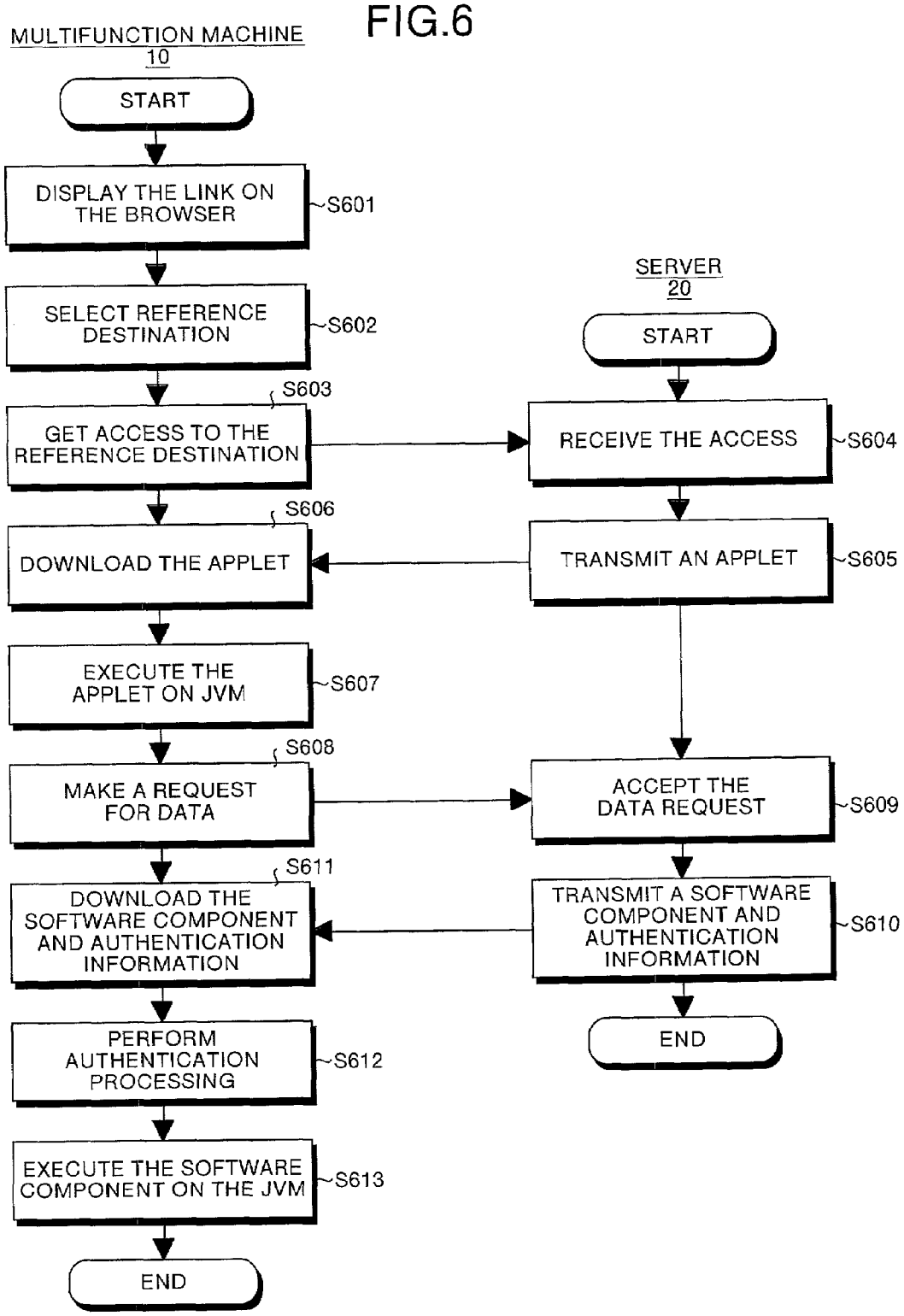

FIG.7A

```
<html>
<head>
  <title> Component 1</title>
</head>
<body>
<applet code="SoftwareComponentLoader.class"width="640"height="400">
  <param name="software"value="comp1.class">
  <param name="authentication"value="comp1.aut">
</applet>
</body>
</html>
```

FIG.7B

| APPLICATION (SOFTWARE COMPONENT) | | | | | |
|---|---|---|---|---|---|
| CONTROL CLASS | | | | STANDARD CLASS | |
| JVM | | | | | |
| API | | | | | |
| ECS | MCS | FCS | SCS | OCS | NCS |
| OS | | | | | |

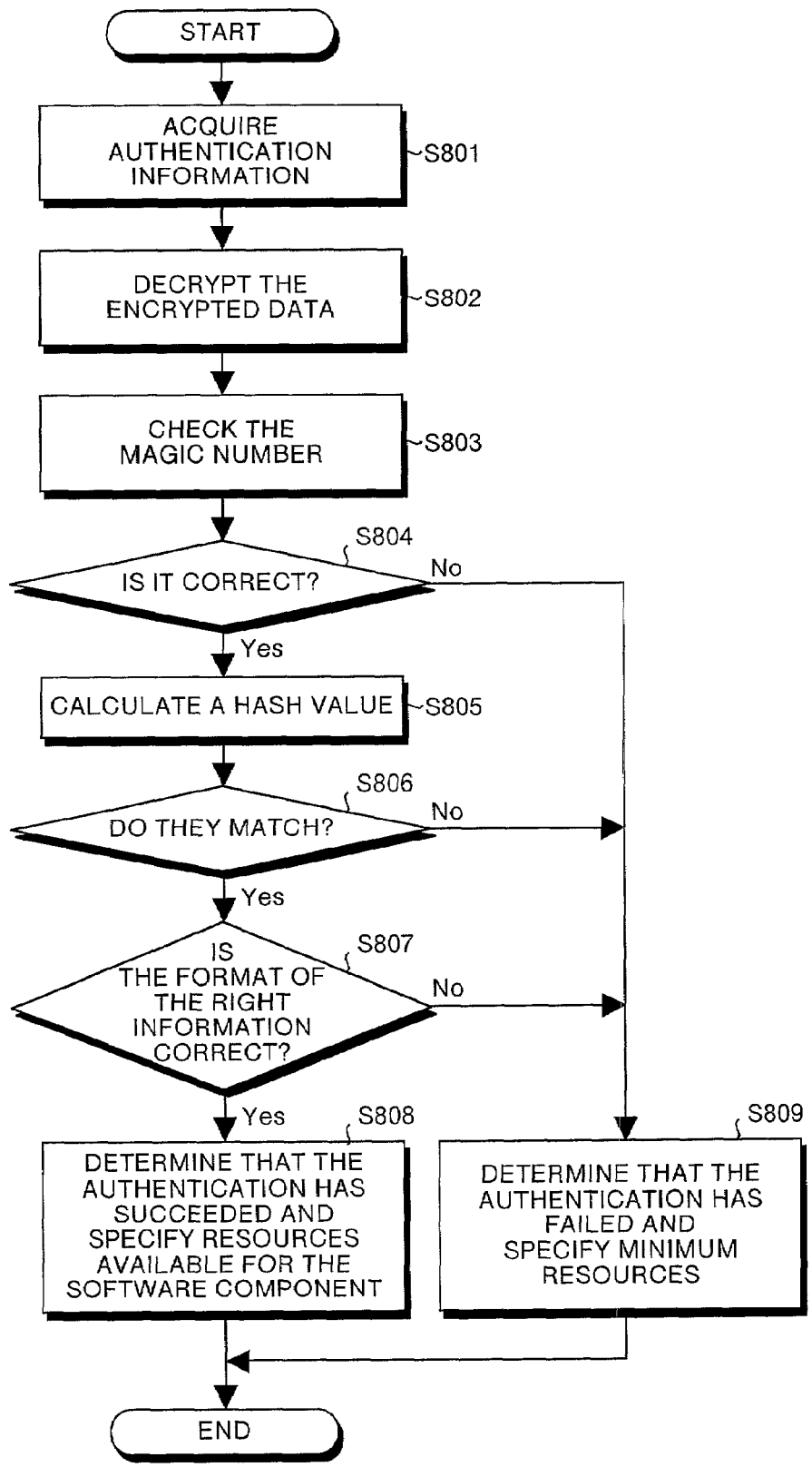

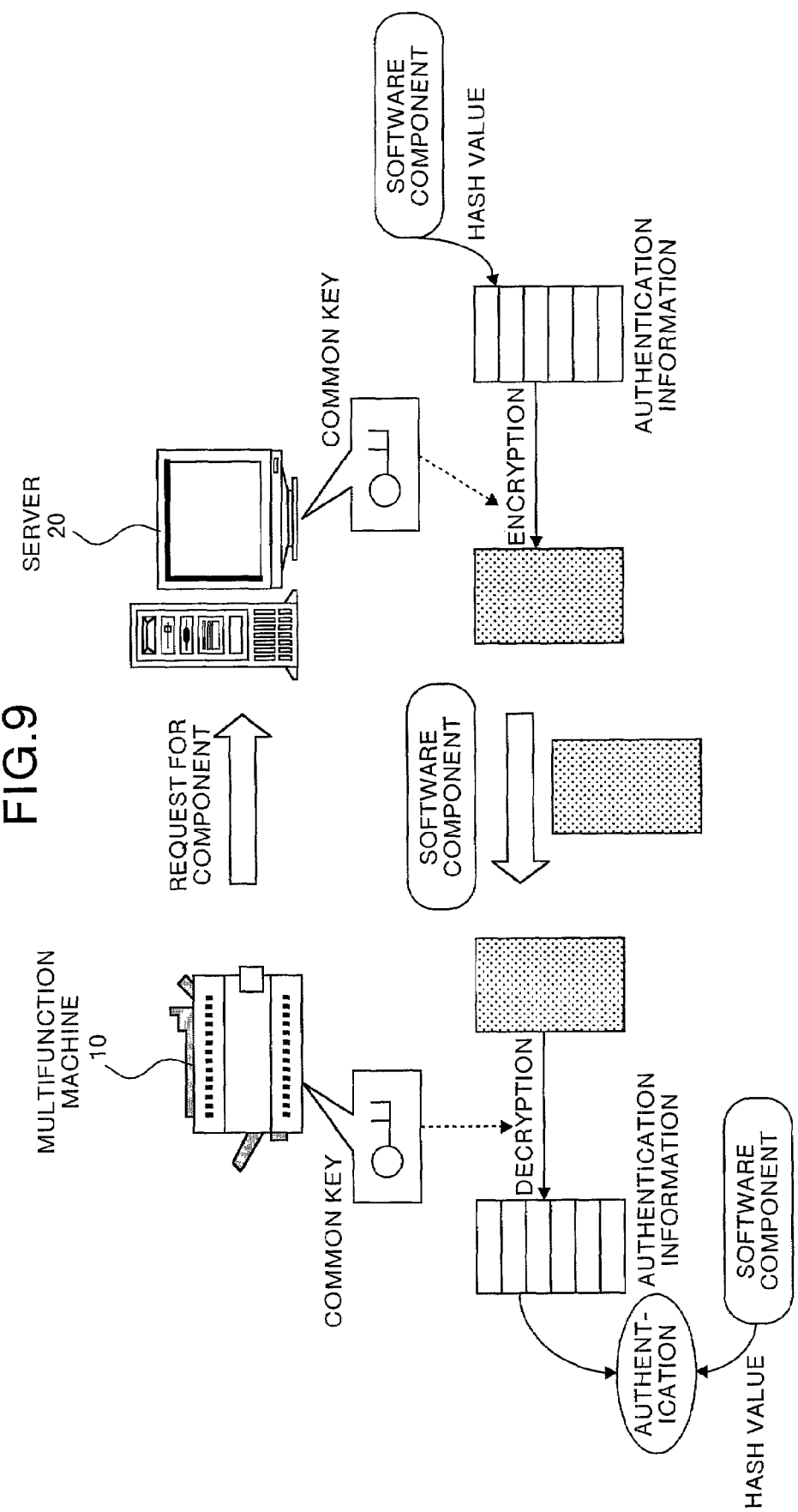

IMAGE FORMATION SYSTEM, SOFTWARE ACQUISITION METHOD, AND COMPUTER PRODUCT

FIELD OF THE INVENTION

The present invention relates to an image formation system comprising an image formation apparatus and a server that are connected to each other via a network. The server provides software components to the image formation apparatus. This invention relates to legitimately and efficiently acquiring and executing software components pertinent to the operation of the image formation apparatus after the image formation apparatus has been activated.

BACKGROUND OF THE INVENTION

Conventionally, a printer, a copier, and a facsimile have been generally provided as discrete devices. Recently, there is known an image formation apparatus in which functions of the above-mentioned devices are accommodated into one cabinet (hereafter called "multifunction machine").

This multifunction machine has a display section, printing section, and an image pickup section within one cabinet, and also has software corresponding to a printer, copier, and a facsimile device. Switching the software allows the machine to operate as the printer, copier, or the facsimile device.

If such a multifunction machine is available, the cost and space can be in total reduced, because, there is no need to separately provide the printer, the copier, and the facsimile device.

However, such multifunction machines are generally delivered to a client after pre-installing desired softwares that perform predetermined functions. Therefore, the important matter is how to adequately update the existing functions or add new functions after the multifunction machine has been delivered.

For example, when a technology of downloading software from a server through a network and executing it on a multifunction machine is employed, it is necessary to avoid downloading of malicious software from an unauthorized server and to refuse an access request to software from an unauthorized terminal that impersonates an authorized multifunction machine.

Even if a copier is authorized, it is not appropriate to permit the copier to execute any functions other than functions previously contracted. Further, even if the functions are previously contracted, it is not worth downloading the functions (software) if they are useless from the viewpoint of a hardware configuration of the copier Based on these facts, it is important to legitimately and efficiently acquire and execute software adequate for a multifunction machine after the multifunction machine is activated.

SUMMARY OF THE INVENTION

It is an object of this invention to provide an image formation system capable of legitimately and efficiently acquiring and executing software adequate for an image formation apparatus after the image formation apparatus is activated, and to provide a software acquisition method and a computer-readable recording medium where a computer program for making a computer execute the method is recorded.

The image formation system according to one aspect of this invention comprises an image formation apparatus connected to a network, the image formation apparatus having one or more hardware resources of a display section, an operation panel section, a printing section, and an image pickup section, wherein the image formation apparatus capable of providing one or more services of a printer, a copier,or a facsimile; and a server connected to the network, the server providing a software component to the image formation apparatus via the network. The image formation apparatus includes a selection unit that selects a desired software component from a list of software components accumulated in the server and displayed on the display section; an acquisition unit that acquires the software component selected by the selection unit and authentication information from the server; and a control unit that controls processing operation of the software component acquired by the acquisition unit based on the authentication information acquired by the acquisition unit.

The image formation system according to one aspect of this invention is realized in an image formation system which connects an image formation apparatus and a server to a network, the image formation apparatus having hardware one or more of resources of a display section, an operation panel section, a printing section, and an image pickup section and for providing one or more of services of a printer, a copier, or a facsimile, and the server providing a software component to the image formation apparatus. The image formation apparatus performs the steps of selecting a desired software component from a list of software components accumulated in the server and displayed on the display section; acquiring the selected software component and authentication information from the server; and controlling a processing operation of the acquired software component based on the acquired authentication information.

According to the above-mentioned aspects of the present invention, a desired software component selected from a list of software components accumulated in a server displayed on a display section. Further, the selected software component and authentication information is acquired from the server. The acquired software component processed based on the acquired authentication information. Therefore, the software component can be executed or not executed based on the result of authentication.

The recording medium according to still another aspect of this invention stores a computer program for making a computer execute the method according to this invention. As a result, the method according to this invention can be easily and automatically executed on the computer.

Other objects and features of this invention will become apparent from the following description with reference to the accompanying drawings.

BRIEF DESCRIPTION OF THE DRAWINGS

FIG. 4 is a flowchart showing a processing sequence when downloading is executed by a plug-in;

FIG. 5A shows URLs of software components owned by the server, and FIG. 5B shows an example of HTML description;

FIG. 6 is a flow chart showing a processing sequence when the software component is downloaded using the JAVA programming language;

FIG. 7A shows an example of an HTML file as a target to be linked, and FIG. 7B shows a software configuration of the multifunction machine in the above case;

FIG. 8 is a flowchart showing a processing sequence of the multifunction machine when authentication is performed using a common encryption key;

FIG. 9 is a conceptual diagram for explaining a concept of how to perform authentication using the common encryption key;

DETAILED DESCRIPTION

Embodiments of the image formation system, the software acquisition method, and the computer-readable recording medium according to this invention will be explained in detail below with reference to the accompanying drawings.

Figure 1:
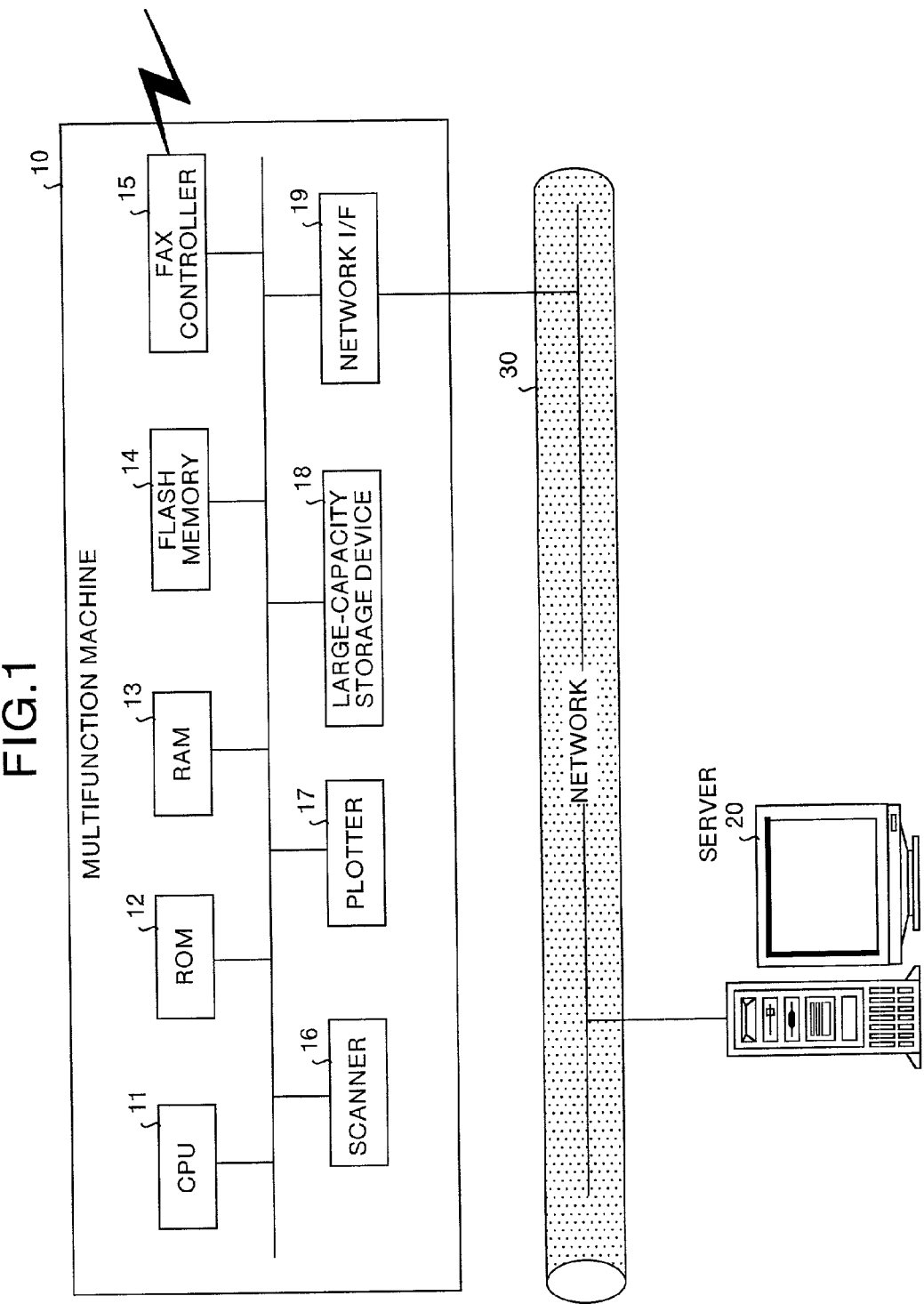
FIG. 1 is a block diagram showing a system construction of the image formation system and a hardware configuration of the multifunction machine according to an embodiment of this invention.

The system construction of the image formation system according to an embodiment of this invention will be explained first. FIG. 1 is a block diagram showing the system construction of the image formation system and the hardware configuration of the multifunction machine 10 according to this embodiment.

As shown in FIG. 1, this image formation system has the multifunction machine 10 that makes a request for a software component and the server 20 that provides the software component in response to the request from the multifunction machine 10, which are connected to each other through a network 30.

This multifunction machine 10 has the CPU 11, ROM 12, RAM 13, flash memory 14, FAX controller 15, scanner 16, plotter 17, large-capacity storage device 18, and the network I/F section 19.

The CPU 11 is a central processing unit that loads software stored in the ROM 12 or the flash memory 14 into a main storage device (RAM 13) and executes the software. The ROM 12 is a read only memory, the RAM 13 is a volatile memory that is readable and writable, and the flash memory 14 is an erasable nonvolatile memory. Embedded software can also execute the program stored in the ROM 12 without being loaded into the RAM 13.

The FAX controller 15 controls facsimile transmission and reception, and the scanner 16 is an image input section that optically scans an original. The plotter 17 is an image output device that prints image data on printing paper, and the large-capacity storage device 18 is a secondary storage medium such as a hard disk that stores various types of software. The network I/F section 19 is a processing section that functions as an interface with the network 30.

Figure 2:
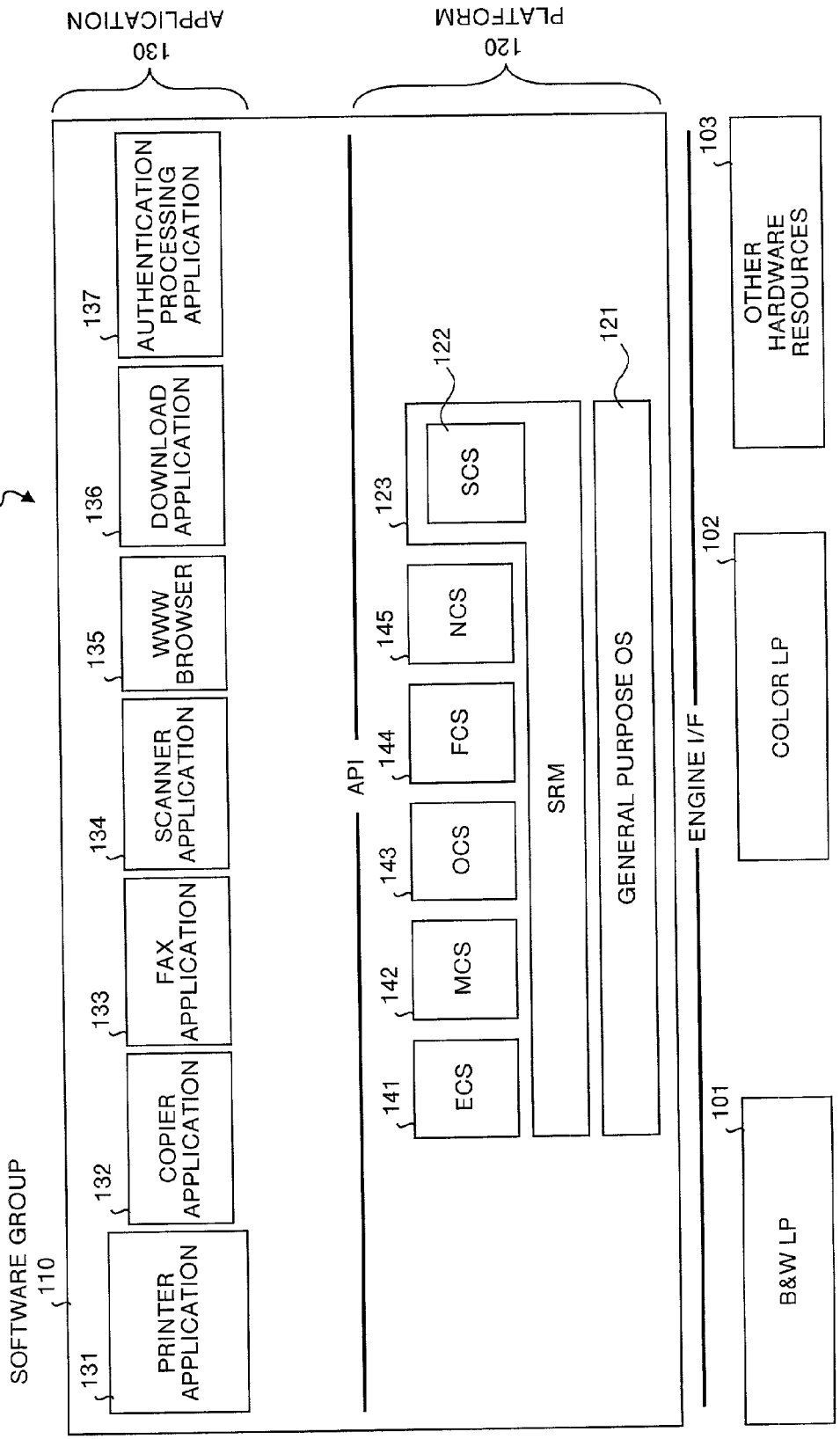
FIG. 2 is a block diagram showing a software configuration of the multifunction machine shown in FIG. 1.

FIG. 2 is a block diagram showing the software configuration of the multifunction machine 10 shown in FIG. 1. The multifunction machine 10 shown in the figure displays a list of software components accumulated in the server 20 on the display section. When a user selects a required software component, the multifunction machine 10 downloads the software component accumulated on the server 20 into the machine to extend its own function.

At this time, the multifunction machine 10 performs authentication based on the authentication information received by the server 20, and decides whether each of the resources provided in the machine is allowed to be used based on the result of the authentication. That is, the component downloaded from the server, whose authentication has succeeded, can use all the functions of the machine. But restrictions are put on the functions to be used by the component downloaded from the server whose authentication has failed. For example, using a printing function and scanning function is restricted in a multi function printer (MFP), so that the MFP can execute only graphics display on the display section.

When the machine transmits its own identification information (ID) to the server 20 whose authentication has succeeded, the server 20 can retrieve the customer information and displays the software components matching the information, or can transmit the list to the multi function machine 10. Further, when the configuration information of the software or hardware is transmitted to the server 20, the server 20 can display the executable software components or transmit the list of the components to the multifunction machine 10.

More specifically, as shown in FIG. 2, the multifunction machine 10 has the Black & White Line Printer (B&W LP) 101, Color Line Printer (Color LP) 102, and some other resources such as hardware resources 103, and has the software group 110 that consists of the platform 120 and the application 130.

The platform 120 consists of the general purpose OS 121 and System Resource Manager (SRM) 123 having the System Control Service (SCS) 122, and various types of control services 141 to 145. The general purpose OS 121 is a general purpose operating system such as UNIX, and executes parallel processing of the respective control services on the platform 120 and the respective software of the application 130, each of which is a discrete process.

By using the UNIX as open source, reliability of the program can be ensured, the OS can support for networks, and source code becomes easily available. Further, there is no need to pay royalties of OS and TCP/IP, and outsourcing is facilitated.

The SRM 123 together with the SCS 122 controls the system and manages the resources, arranges the resources according to requests from a higher layer that uses the hardware resources: engines of the scanning section and printer section, memory, HDD file, and host I/O (Centronic I/F, network I/F, IEEE1394 I/F, RS232C I/F, etc.), and controls its execution.

More specifically, the SRM 123 determines whether the requested hardware resource is available (whether the resource is being used by another request), and sends a message that the requested hardware resource is available to the higher layer when it is available. By scheduling usage of the hardware resources for the requests from the higher layer, the SRM 123 may directly execute the contents of the request (e.g., paper conveyance and image forming operation by the printer engine, allocation of memory, and file creation, etc.).

The SCS 122 performs processing such as (1) management of applications, (2) controlling of the operation panel section, (3) display of a system screen such as a job list screen and a counter display screen), (4) LED display, (5) management of resources, and (6) controlling of applications to interrupt. More specifically, for (1) management of applications, the SCS 122 performs registration of applications and notification of the information to another applications. The SCS 122 notifies a registered application of system setting and an engine status according to the setting requested from the application. The SCS 122 queries the application having been registered for transition of power mode or for whether transition of the system status such as interrupt mode is allowed.

For (2) controlling of the operation panel section, the SCS 122 performs exclusive control for the using right of the operation panel section of the application. The SCS 122 then exclusively notifies the application having the using right of the operation panel section of the key information from the operation panel section driver (OCS). With this key information, mask control is performed to temporarily stop notification according to the transition of the system status such as during switching applications.

In (3) display of the system screen, the SCS 122 displays alarm screens for each engine status according to the contents requested from the application having the using right of the operation panel section. One of these screens turns on or off the alarm display such as a user-restricted screen according to the state of the application. Other than the engine status, the SCS 122 provides controls for a job list screen for displaying reservation and situations of executing jobs, a counter screen for displaying a total counter group, and a screen indicating during notification of CSS. With regard to display of these system screens release of the using right of the operation panel section is not requested to the application, but the screen is rendered as a system screen that covers the application screen.

In (4) LED display, the SCS 122 controls a display of alarm LED and a system LED such as application keys. The application uses directly the display driver to control the LED specific to the application.

In (5) management of resources, when the application (ECS) executes a job, the SCS 122 provides service for exclusive control of the engine resources (scanner, staple, etc.) that have to be excluded. In (6) controlling of applications to interrupt, the SCS 122 provides control and service so as to preferentially operate a particular application.

The control service includes Engine Control Service (ECS) 141, Memory Control Service (MCS) 142, Operation panel Control Service (OCS) 143, FAX Control Service (FCS) 144, and Network Control Service (NCS) 145.

The ECS 141 controls engines for the black and white line printer (B&W LP) 101, color line printer (Color LP) 102, and some other hardware resources 103, or the like, and performs processing such as image read, printing operation, its status notification, and jam recovery.

More specifically, the ECS 141 performs a series of copying/scanning/printing operation by successively issuing print requests to the SRM 123 according to specification of the job mode received from the application 130. The jobs as targets to be handled by the ECS 141 are assumed to specify SCANNER in the image input device, or to specify PLOTTER in the image output device.

For example, in the case of the copy operation, "SCANNER→PLOTTER" is specified, "SCANNER→MEMORY" is specified for file accumulation, and "SCANNER→FAX_IN" is specified for facsimile transmission. In the case of printing an accumulated file or printing from a printer application 131, "MEMORY→PLOTTER" is specified, while in the case of facsimile reception, "FAX_OUT→PLOTTER" is specified.

Although the definition of a job depends on applications, a processing operation for a set of image groups handled by a user is defined here as one job. For example, in the case of Automatic Document Feeder (ADF) mode of copy, the operation of reading a set of originals placed on a document support is defined as one job, and in a pressure plate mode, a read operation until a final original is confirmed is defined as one job. Further, in the case of a copier application 132, an operation of copying a bundle of originals is one job, an operation of transmitting one document or an operation of receiving one document is one job in the case of a facsimile application 133, and an operation of printing one document is one job in the case of the printer application 131.

The MCS 142 performs memory control. More specifically, the MCS 142 performs processing such as acquisition and release of the image memory, utilization of a hard disk drive (HDD), and compression or decompression of the image data.

Functions required for managing necessary information as image data files accumulated in the hard disk drive include (1) a file access (creation/deletion/open/close) function (including exclusive processing), (2) management of various types of file attributes (management of image data as files by each physical page) such as management of file names/IDs (files/users)/passwords management/accumulated time management/the number of pages/data formats (compression system, etc.)/access restriction/creation of an application/management of printing conditions, (3) connection/insertion/cut functions by the file or page, (4) a file sort function (accumulated time order/user ID order, etc.), (5) notification (for display/retrieval) of all file information, (6) a recovery function (abandon of a file/page of a damaged file), and (7) an automatic deleting function of files, or the like.

As a function to hold image data in memory such as RAM and get access to the memory, there are (1) a function of acquiring a file and information for page/band attributes from the application 130, and (2) functions of allocating and releasing a region of image data from the application 130, and read and write functions of image data.

The OCS 143 is a module that controls the operation panel as an information transmission unit between an operator and control of the main body, and performs processing of notifying the control of the main body of a key operating event by the operator, providing library functions required when the respective applications construct GUI, managing the constructed GUI information for each application, and of reflecting the information on the display of the operation panel, or the like.

This OCS 143 has (1) a function of providing library for GUI architecture, (2) a function of managing hardware resources of the operation panel section, (3) VRAM drawing/LCD display functions (display of hardware, switching of displayed applications, switching of displayed languages, dark colored display on window, display of message/icon blink, and display of linked messages), (4) a hardware key-entry detection function, (5) a touch panel key-entry detection function, (6) an LED output function, and (7) a beeper output function, and the like.

The FCS 144 provides an API for facsimile transmission and reception using PSTN/ISDN network from each application layer of the system controller, registration/citation of various facsimile data managed by BKM (backup SRAM), facsimile reading, facsimile reception/printing, or merged transmission and reception.

More specifically, this FCS 144 has functions such as (1) a transmission function of transmitting a document requested for transmission from the application layer, to a facsimile receiver using the PSTN/ISDN network, (2) a reception function of forwarding and printing a facsimile reception screen received from the PSTN/ISDN network or various types of reports to each application layer, (3) a telephone directory citation/registration function of citing and registering facsimile management items such as a telephone directory or group information stored in a facsimile board, (4) a facsimile log notification function of notifying any application that requires history information for transaction results stored in BKM mounted on a facsimile board, of such history information, and (5) an event notification function of notifying an application registered in the FCS of a changed event when the status of the facsimile board is changed.

The NCS 145 is a group of modules for providing commonly available services to any application requiring network I/O, assigns data received by each protocol from the network to each of the applications, and acts as a medium when the data is transmitted from the application to the network. More specifically, the NCS 145 has server daemons such as ftpd, httpd, lpd, snmpd, telnetd, or smtpd, and client functions having the same protocol.

The application 130 has Page Description Language (PDL) and a printer application 131 as an application for a printer having PCL and PostScript (PS). This application 130 also has a copier application 132 as an application for a copier, a facsimile application 133 as an application for a facsimile, and a scanner application 134 as an application for a scanner. The application 130 further has a WWW browser 135 for browsing WWW (World Wide Web) pages as a distributed system on the Internet, a download application 136 that downloads a software component and so on from the server 20, and an authentication processing application 137 that performs authentication processing based on authentication information accepted from the server 20. The download application 136 and authentication processing application 137 will be explained in detail later.

As explained above, the multifunction machine 10 encloses a common part between the application 130 and the control services as a platform 120, and places the control services 141 to 145 and the applications 131 to 137 on this platform 120. Therefore, each of these control services 141 to 145 and applications 131 to 137 can be handled as a software component.

Figure 3:
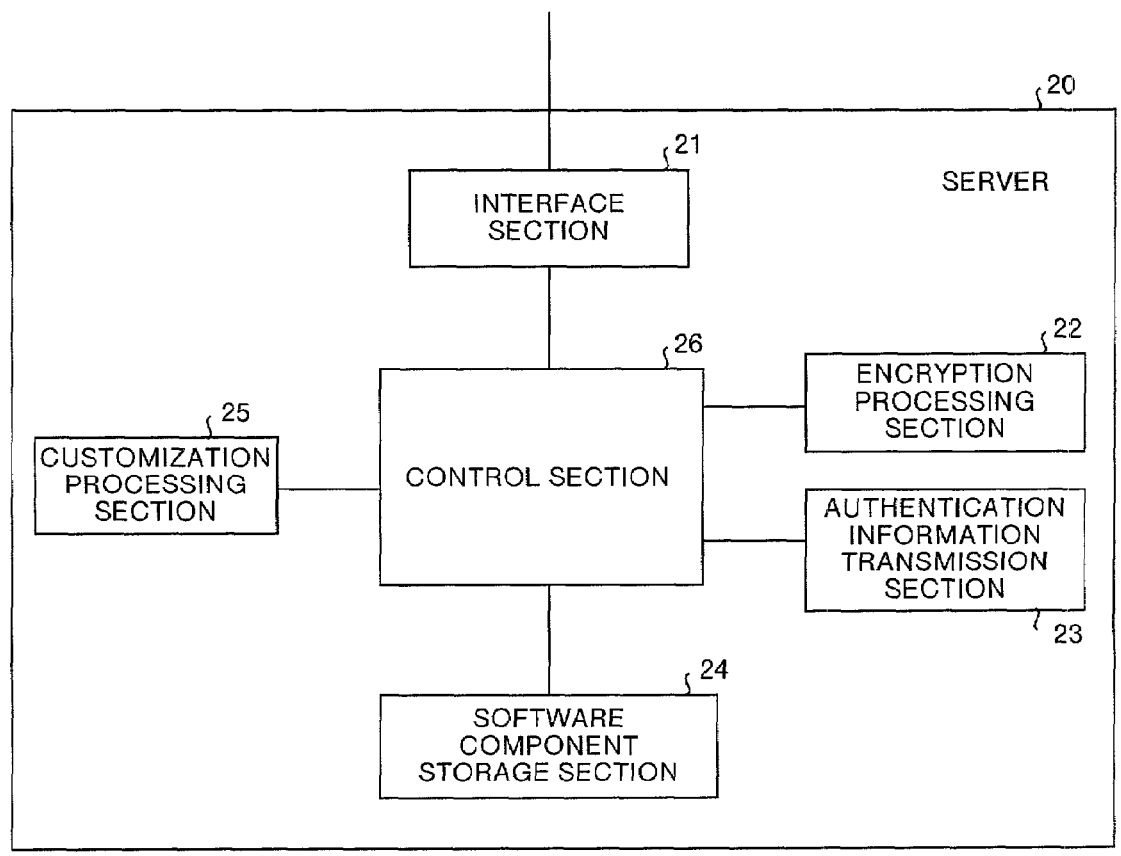
FIG. 3 is a functional block diagram showing a configuration of the server shown in FIG. 1.

The configuration of the server 20 shown in FIG. 1 will be explained below. FIG. 3 is a functional block diagram showing the configuration of the server 20 shown in FIG. 1. The server 20 is a WWW server that can browse pages using the WWW browser of the multifunction machine 10, and comprises the interface section 21, encryption processing section 22, authentication information transmission section 23, software component storage section 24, customization processing section 25, and the control section 26.

The interface section 21 is a data input/output section that is connected to a LAN (Internet) using TCP/IP protocol and performs data transaction using HyperText Transfer Protocol (HTTP).

The encryption processing section 22 encrypts authentication information consisting of a hash value of a software component using a secret key or a public key held inside the device. The authentication information transmission section 23 is a processing section that transmits authentication information in response to the request of the multifunction machine 10 when the multifunction machine 10 authenticates whether the server 20 has been registered.

The software component storage section 24 is a software database that accumulates software components developed by the machine development vendor or third vendors. The customization processing section 25 is a processing section that retrieves a software component adequate for the model or the configuration of the multifunction machine 10 from the software component storage section 24 when receiving configuration information for the machine such as the software configuration or hardware configuration of the multifunction machine 10. The control section 26 controls the overall server 20, and outputs a request accepted from the multifunction machine 10 to a desired processing section according to the contents of the request.

Downloading of a software component using the download application 136 of the multifunction machine 10 shown in FIG. 2 will be explained below in (1) a case of its performance with a plug-in, and (2) a case of its performance with an applet written in the JAVA programming language.

(1) Performance of Downloading with the Plug-in

Figure 4:
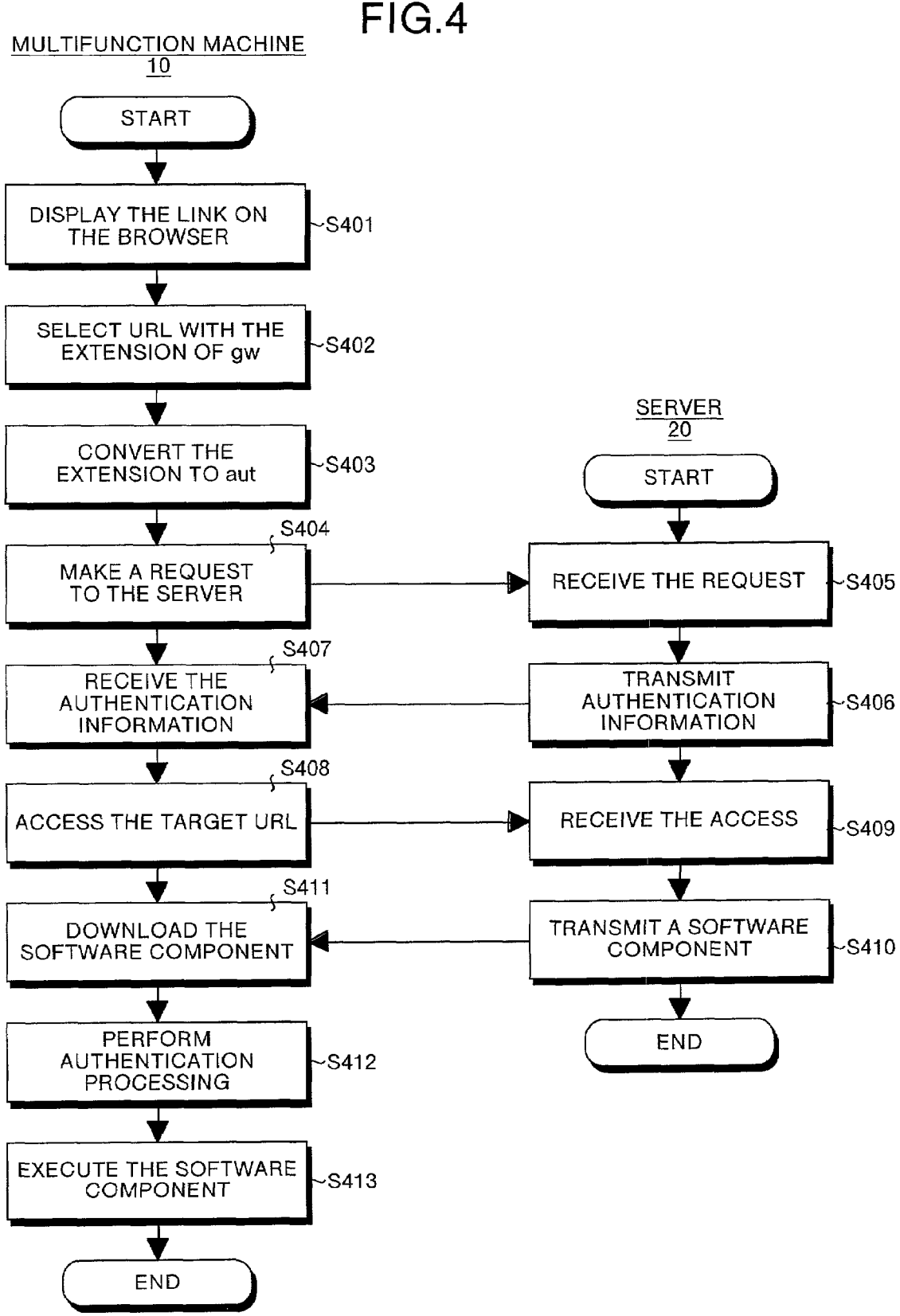

FIG. 4 is a flowchart showing the processing sequence when downloading is executed with the plug-in. FIG. 5A shows URLs of software components owned by the server, and FIG. 5B shows an example of HTML description.

As shown in FIG. 5A, the software component placed in the server 20 has an extension of "gw", and the authentication information has an extension of "aut". This figure also shows a URL of an HTML file including a link to a list of components, URL of a software component 1, URL of authentication information for the software component 1, URL of a software component 2, and a URL of authentication information for the software component 2.

As shown in FIG. 4, the multifunction machine 10 displays the link on the browser (step S401), and when the user selects the link displayed on the browser and the reference destination of this link is the URL with the extension gw (step S402), the browser starts the plug-in for downloading the software.

This plug-in converts first the extension of the target URL as reference destination to aut (step S403), and issues a request to the server (step S404). When receiving the request (step S405), the server 20 transmits the authentication information to the multifunction machine 10 (step S406). Accordingly, this multifunction machine 10 acquires the authentication information (step S407).

Subsequently, when the user accesses the target URL through the multifunction machine 10 (step S408), the server transmits a software component in response to this access (steps S409 to S410), and the multifunction machine 10 downloads the software component (step S411).

The multifunction machine 10 then performs authentication processing explained later (step S412), and executes the downloaded software component by the plug-in (step S413).

Although "comp_list.html" can be expressed as shown in FIG. 5B, HTML including the software component can also be described by using an EMBED tag and an object tag other than the tags shown here.

(2) Performance of Downloading with an Applet Written in the JAVA Programming Language When the reference destination of the link of a software component is an HTML file including an applet written in the JAVA programming language, the multifunction machine 10 can also download the software component described as this applet written in the JAVA programming language and execute the component. However, in this case, the multifunction machine 10 is required to provide a JAVA Virtual Machine (JVM), a virtual machine for the JAVA platform.

FIG. 6 is a flow chart showing the processing sequence when the software component is downloaded using the JAVA programming language. FIG. 7A shows an example of the HTML file as a target to be linked, and FIG. 7B shows the software configuration of the multifunction machine 10 in the above case.

As shown in FIG. 6, the multifunction machine 10 displays the link on the browser (step S601), and when the user selects the reference destination as shown in FIG. 7A on the browser to access the reference destination (steps S602 to S604), the multifunction machine 10 downloads an applet (SoftwareComponentLoader.class) for downloading a software component from the server 20 (steps S605 to S606).

When this applet is executed on the JVM (step S607), the applet downloads the component indicated by the "software" parameter and the authentication information indicated by the "authentication" parameter (steps S608 to S611), performs authentication using the authentication information (step S612), and executes the software component on the JVM (step S613).

The software configuration of the multifunction machine 10 in this case is as shown in FIG. 7B. A group of standard classes defined by the JAVA programming language equipped by using the OCS and NCS and a group of control classes, that lap the respective ECS, MCS, SCS, and FCS, operate on the JVM. The downloaded component executes the processing using these class libraries.

The authentication processing executed by the authentication processing application 137 shown in FIG. 2 will be specifically explained below in (1) a case of its performance with a common encryption key, (2) a case of its performance with a public key, and (3) a case of its performance with a certificate. The authentication information is assumed here to include a magic number of "RICOH", a hash value (Message Digest) of a software component, and using rights of resources. For example, the using rights of the resources are as follows:

permission.scanner=true
permission.plotter=false
permission.storage=false
permission.fax=false
permission.panel=true
permission.network=true (1) Performance of Authentication Processing with the Common Encryption Key FIG. 8 is a flowchart showing the processing sequence of the multifunction machine 10 when authentication is performed using a common encryption key. FIG. 9 is a conceptual diagram for explaining the concept of how to perform authentication using the common encryption key.

As shown in FIG. 9, the multifunction machine 10 holds a common encryption key the same as that of the server 20 within the ROM at its shipping, and the server 20 of the machine development vendor holds the data (compl.aut in an example of the plug-in) obtained by encrypting authentication information using the common encryption key together with the software components (compl.gw).

As shown in FIG. 8, when acquiring the authentication information (step S801), the multifunction machine 10 decrypts the data with the common encryption key held within the ROM (step S802), and checks the magic number included in the decrypted data (step S803).

When this magic number is not correct (step S804, No) the multifunction machine 10 determines that the authentication has failed, and specifies minimum resources such as only the display section and operation panel section (step S809).

On the other hand, when the magic number is correct (step S804, Yes), the multifunction machine 10 calculates a hash value from the downloaded software component (step S805), and checks whether this hash value matches the value included in the authentication information (step S806). When these two do not match (step S806, No), the multifunction machine 10 determines that the authentication has failed, and specifies the minimum resources (step S809).

When these two match (step S806, Yes), the multifunction machine 10 checks whether the right information is described in the correct format (step S807). When it is described in the correct format (step S807, Yes), the multifunction machine 10 determines that the authentication has succeeded, and specifies the resources available for the software component (step S808). When it is not described in the correct format (step S807, No), the multifunction machine 10 determines that the authentication has failed, and specifies the minimum resources (step S809).

Figure 10A:
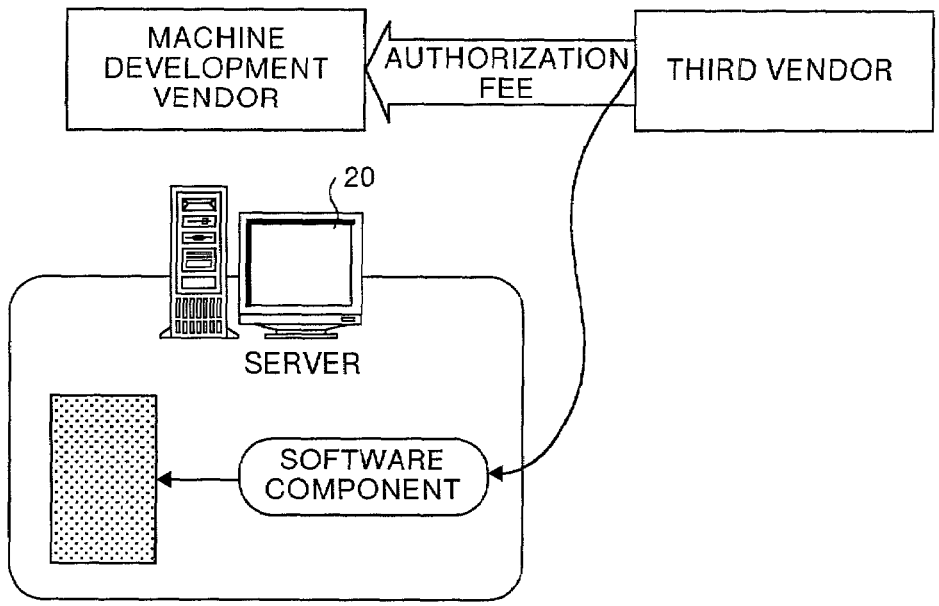
FIG. 10A and FIG. 10B show diagrams for explaining how a third vendor provides a software component.
Figure 10B:
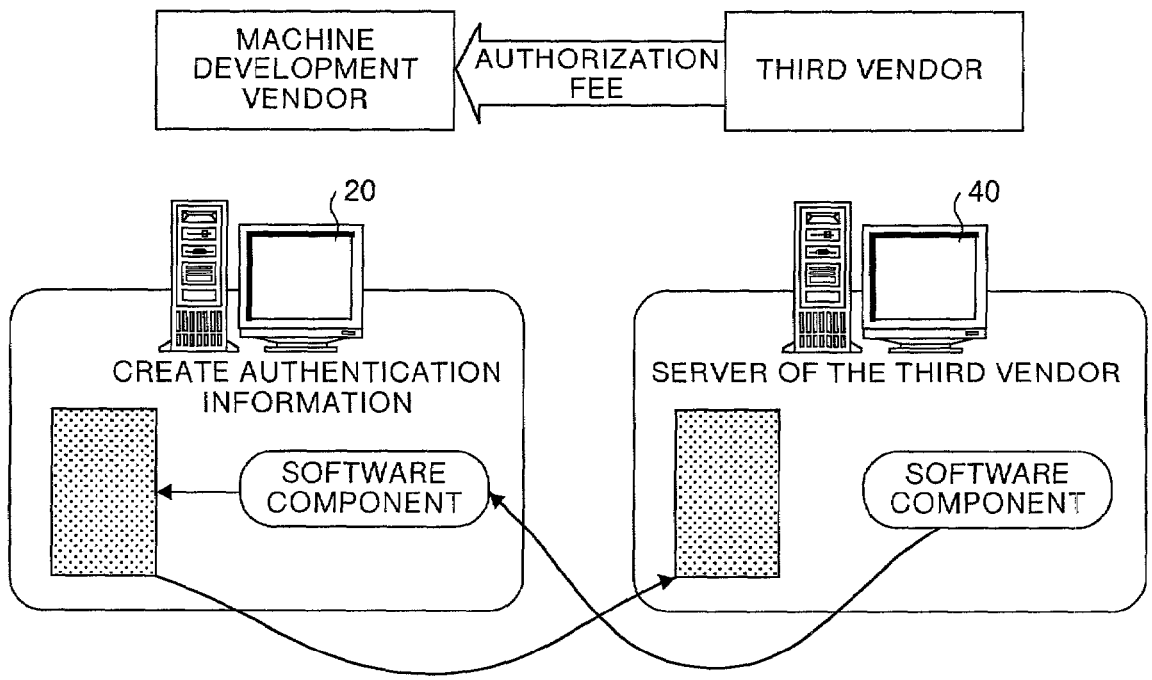

In this case, a third vendor has two methods as shown in FIGS. 10A and 10B to provide a software component. More specifically, as shown in FIG. 10A, one of the methods is that the third vendor pays a registration fee to the machine development vendor and, in exchange for this, the server 20 of the machine development vendor discloses the software component to the third vendor.

As shown in FIG. 10B, the third vendor pays an authorization fee to the machine development vendor, and the machine development vendor creates encrypted authentication information in exchange for the authorization fee to transmit the information to the server 40 of the third vendor. Such an authorization fee is changed from time to time according to setting of rights.

(2) Performance of Authentication Processing with the Public Key

Figure 11:
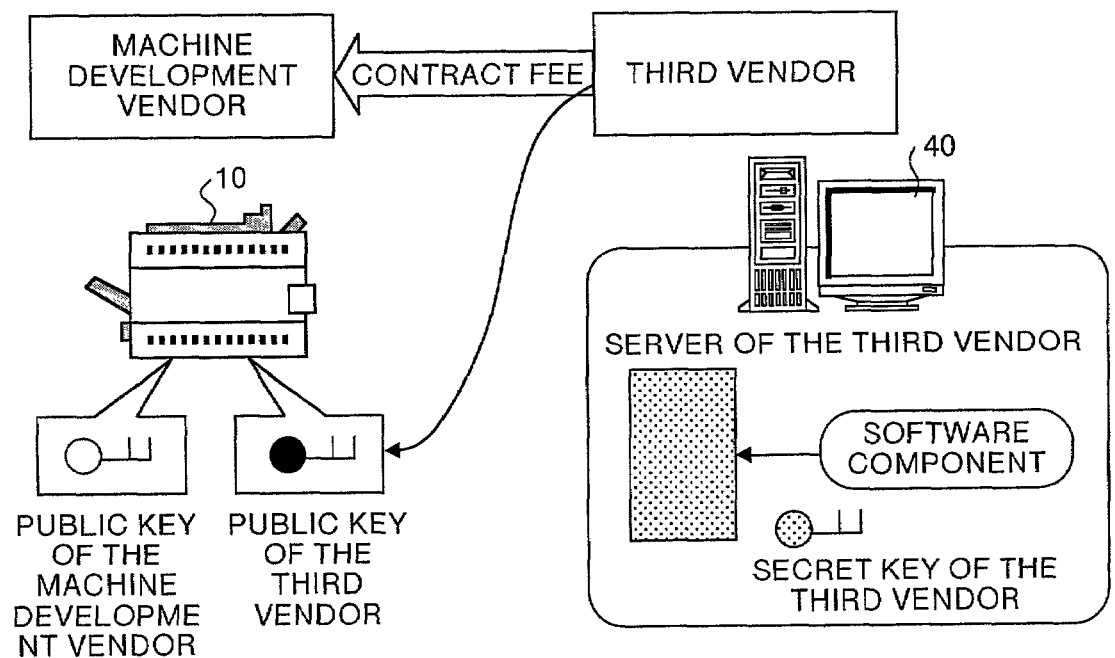
FIG. 11 is a conceptual diagram for explaining a concept of how to perform authentication using a public key.

FIG. 11 is a conceptual diagram for explaining the concept of how to perform authentication using a public key. As shown in FIG. 11, the multifunction machine 10 holds a public key of the machine development vendor within the ROM at its shipping, and the server 20 of the machine development vendor holds the data obtained by encrypting authentication information using the secret key with respect to the public key together with the software components.

The multifunction machine 10 acquiring the authentication information decrypts the data with the public key held within the ROM. The sequence of authentication thereafter is the same as the case where the common key is used.

In order for the third vendor to provide a software component, there is a method of holding the public key of the third vendor as shown in FIG. 11 and using rights of resources within the ROM at the shipping other than the two methods explained in the case of using the common key. In such a case, a larger amount of contract fee is generally paid.

When the common key is used, the third vendor has to disclose the common key to the machine development vendor. Therefore, such a method is not realistic. But concealment of encryption is not lowered even if the public key is disclosed, therefore, any particular problem may not occur.

As explained above, when the public key of the third vendor is previously held in the ROM, the third vendor can feely set the using rights of resources. However, by purchasing the encrypted setting information from the machine development vendor and decrypting the information in the multifunction machine 10 that has downloaded the information, it is possible to prevent the third vendor from its freely setting rights.

(3) Performance of Authentication Processing with the Certificate

Figure 12:
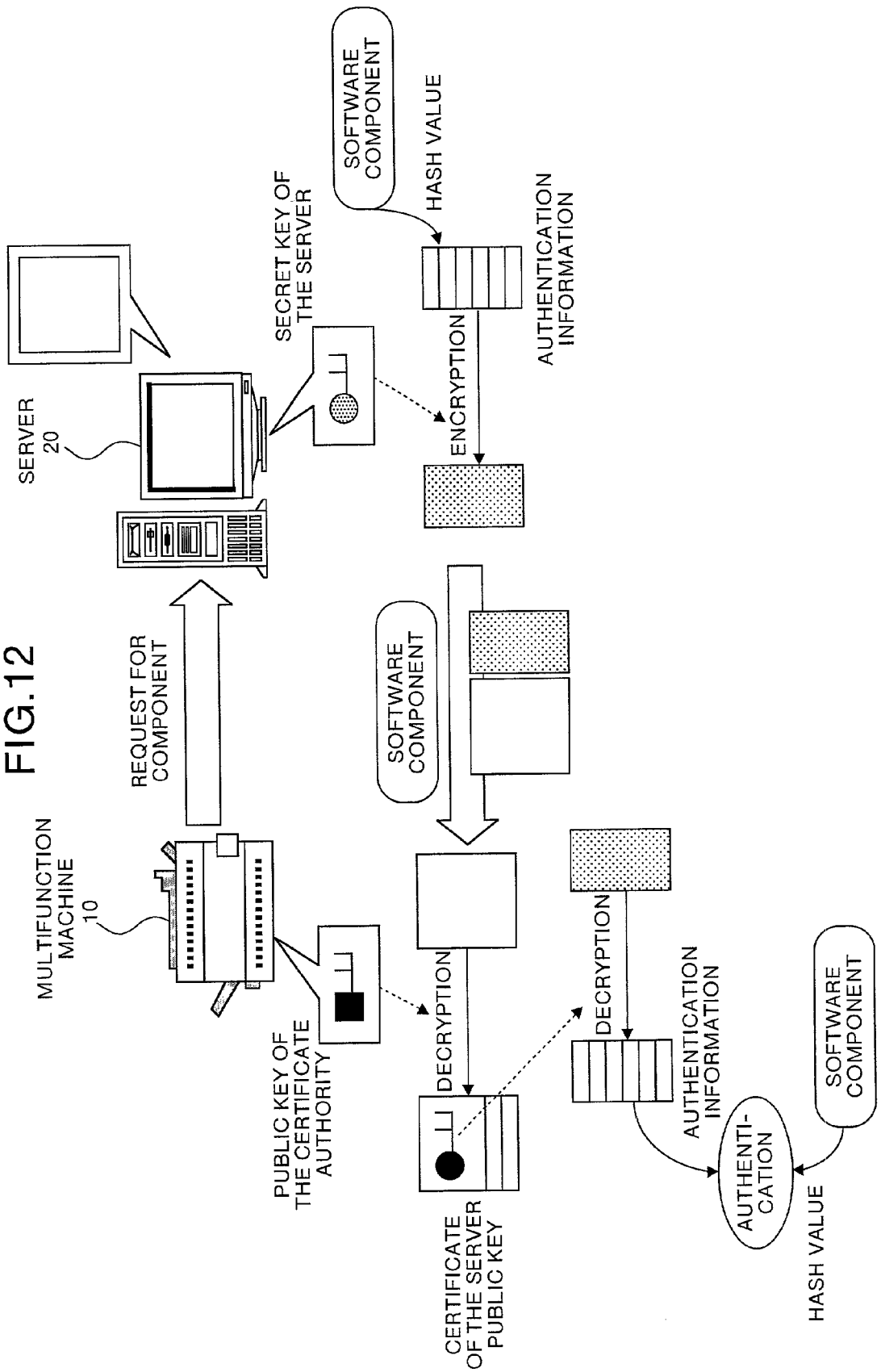
FIG. 12 is a conceptual diagram for explaining a concept of how to perform authentication using a certificate.

FIG. 12 is a conceptual diagram for explaining the concept of how to perform authentication with a certificate. In the figure, the multifunction machine 10 holds a public key of the machine development vendor as a certificate authority at the shipping, and the server 20 that discloses a software component holds the certificate of the public key of the server issued by the machine development vendor (certificate authority). This certificate is encrypted by the secret key of the machine development vendor (certificate authority), and the server 20 attaches this encrypted certificate to the header of the authentication information.

The multifunction machine 10 having acquired the authentication information decrypts first the certificate attached to the authentication information by the public key of the machine development vendor (certificate authority) held within the ROM, extracts the public key of the server from this certificate when the decryption has succeeded, and decrypts the authentication information using this key. The sequence of the authentication from then on is the same as explained above.

Figure 13:
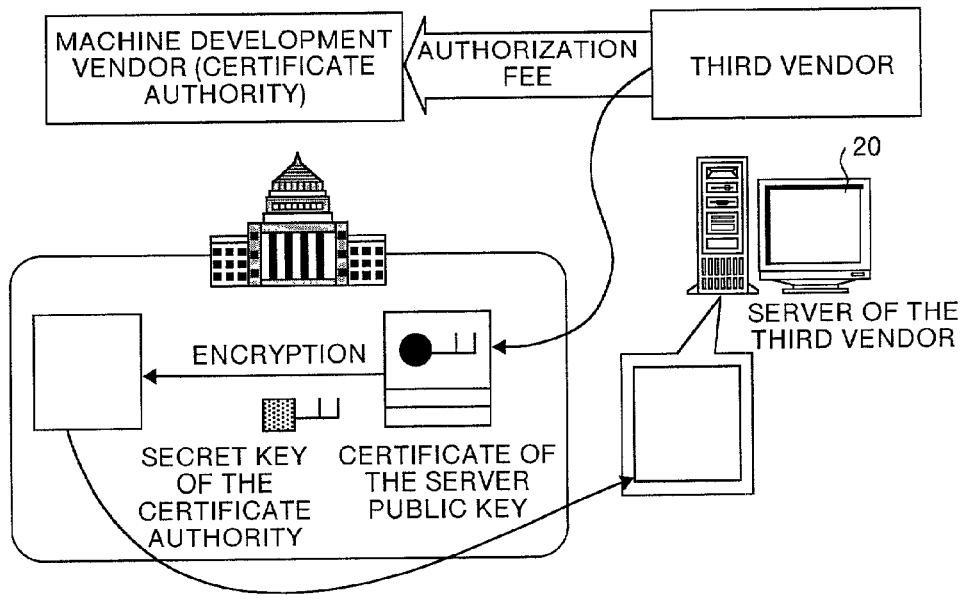
FIG. 13 is a diagram for explaining how a third vendor provides a software component.

In this case, in order for the third vendor to provide a software component, as shown in FIG. 13, the third vendor pays an authorization fee to the machine development vendor and receives the certificate of the encrypted server's public key from the machine development vendor (certificate authority).

When the method based on the public key is used, it is difficult to newly add a server of a third vendor whose public key is not recorded in the ROM at the shipping. But it is possible to add any third vendor to the machine by the method based on the certificate.

Transmission of machine information from the multifunction machine 10 shown in FIG. 1 to the server 20 will be explained below. The multifunction machine 10 transmits the machine information such as optional hardware configuration of the multifunction machine 10, configuration of the installed software, and its serial number is transmitted as header of HTTP.

For example, when the multifunction machine 10 is provided with the ADF as option, the header such as X-Ricoh-MFP-Option: ADF is added to the request of the HTTP, and as the serial number, the header such as X-Ricoh-MFP-Serial: 123-456-789 is added to the request of the HTTP and notified to the server 20.

In order to prevent the machine information from being unnecessarily leaked during this operation, (1) the header information can be encrypted, or (2) the independent authentication protocol can be used. (1) Encryption of the header information can be performed by using the common encryption key or the public key as explained with reference to the authentication. More specifically, the value of the header is encrypted by the encryption key held in the ROM of the multifunction machine 10. In the method of using the certificate, the encryption key cannot previously be acquired, therefore, this method (1) cannot be used. Further, the server of a third vendor cannot decrypt the header information. Therefore, a server is limited to the server of the machine development vendor.

When (2) the independent authentication protocol is used, the method of using the certificate can be applied. However, as explained above, authentication of the server is not performed concurrently when the software component is downloaded, but it is necessary to make a download of a software component independent from a download of the authentication protocol.

More specifically, assuming that an initial access is made to a server, when a particular path, for example, http://www.ricoh.co.jp/certificate is requested and the authorized certificate is sent back in response to the request, it is determined that the server authentication has succeeded, and the request including the header encrypted by the public key included in the certificate is transmitted again. In accordance with this method, the header information is transmitted only to the authorized server, thus it is possible to further enhance the level of security. Further, the server of the third vendor can use the machine information.

Figure 14:
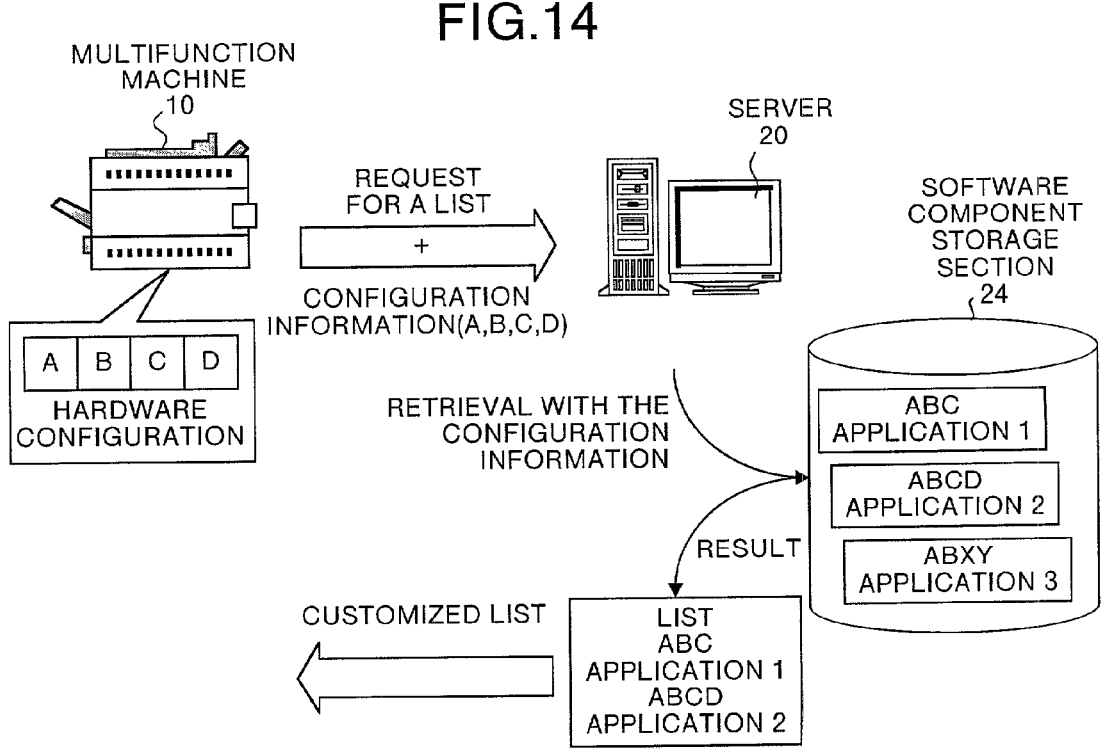
FIG. 14 is a diagram for explaining a case where a list is customized according to the hardware configuration of the multifunction machine.

Customization of a list in the server 20 as shown in FIG. 3 will be explained below. FIG. 14 shows a diagram for explaining the case where a list is customized according to the hardware configuration of the multifunction machine 10.

As shown in the figure, when the multifunction machine 10 transmits a request for a list and configuration information (A, B, C, and D) to the server 20, the server 20 acquires the configuration information for the machine from the HTTP request. The server 20 then retrieves available software components based on the configuration of this machine from the software component storage section 24, and creates a list described in HTML to send the list back to the multifunction machine 10.

Figure 15:
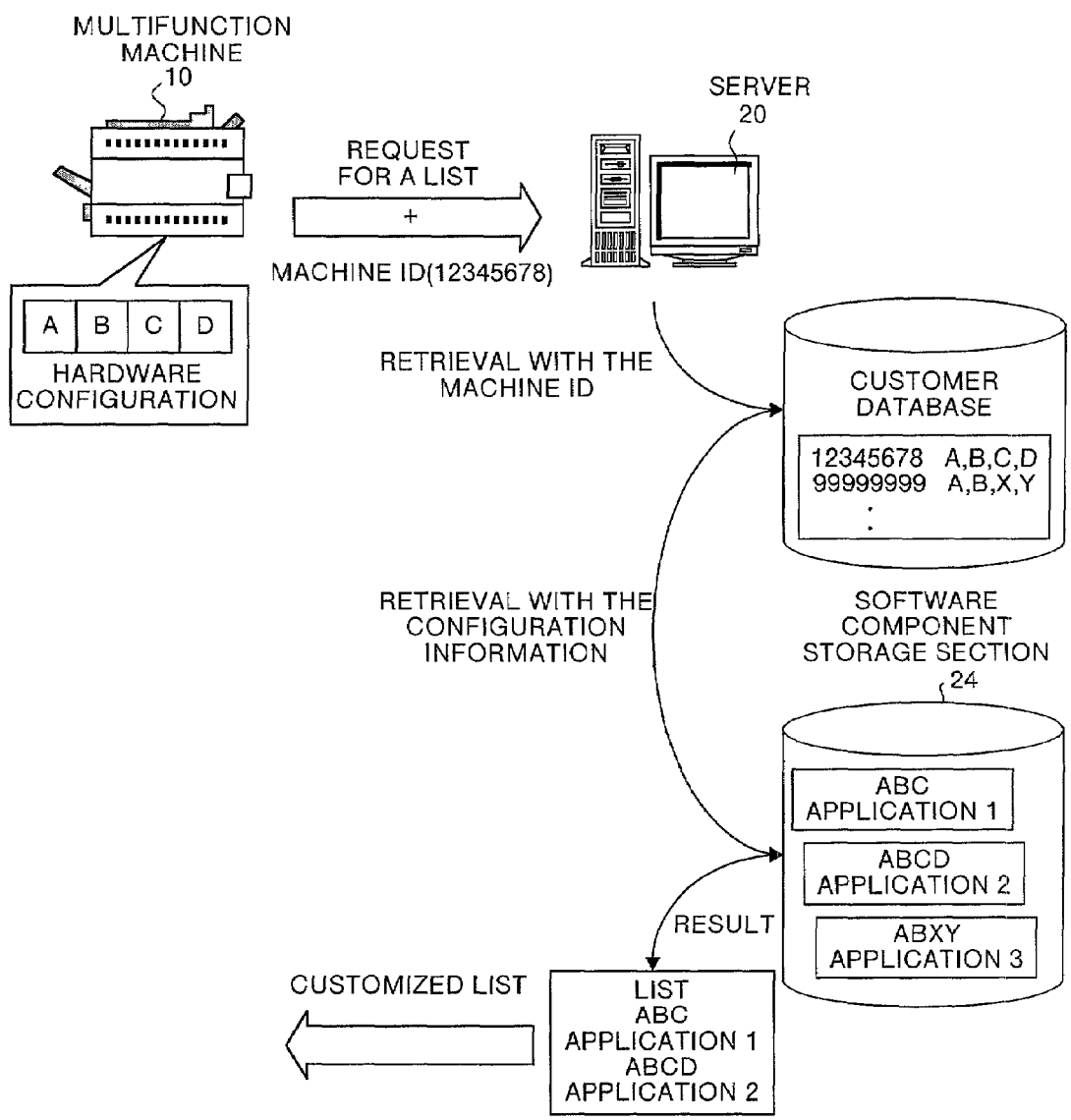
FIG. 15 is a diagram for explaining a case where a list is customized according to the machine ID of the multifunction machine.

FIG. 15 shows a diagram for explaining the case where the list is customized according to the machine ID of the multifunction machine 10. In this case, the multifunction machine 10 transmits the serial number (machine ID) of the machine, and the server 20 retrieves the customer database using this machine ID to acquire configuration information of the multifunction machine 10.

The server 20 retrieves available software components from the software component storage section 24 in the same manner as that of the case shown in FIG. 14, and creates a list described in HTML to send the list back to the multifunction machine 10.

During this operation, the components to be displayed on the list of the software components can be changed according to the contract form of each customer. For example, the components are ranked according to the degree of complexity or usefulness, and the components displayed on the list can be changed according to the ranks of a contract fee.

Although the third vendor cannot retrieve customer information through the serial number, the machine development vendor can provide only information for machine configuration to the third vendor by receiving a contract fee from the third vendor.

Figure 16:
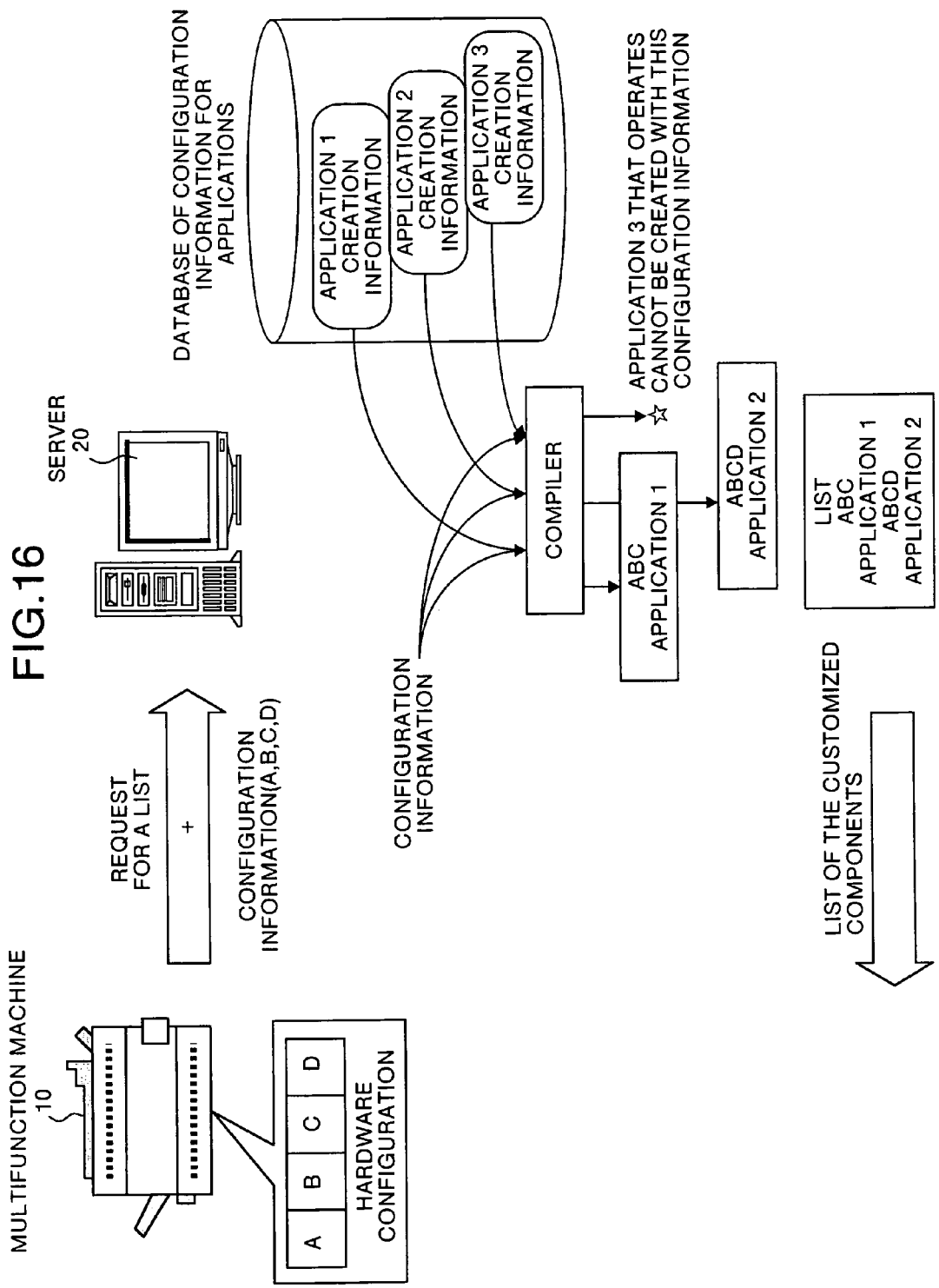
FIG. 16 is a diagram for explaining how the software components are customized in the server shown in FIG. 3.

Customization of software components in the server 20 shown in FIG. 3 will be explained below. FIG. 16 shows a diagram for explaining the case where the software components are customized in the server 20 shown in FIG. 3.

As shown in FIG. 16, the server 20 confirms whether applications that operate can be created based on the creation information within the database of configuration information for applications and on the configuration information received from the multifunction machine 10, and transmits the list of the software components for the created applications to the multifunction machine 10.

As explained above, it is possible to simply retrieve components suitable for configuration of a machine to send the list of the components and to dynamically create such a list. This case requires the server 20 to have a compile environment of the software components. But as shown in FIG. 16, the list can be dynamically created by reconfiguring software components with compile switches for each machine configuration. Accordingly, components can be provided for many machines without preparation of the components for a wide range of machine configurations.

As explained above, in this embodiment, the multifunction machine 10 selects a desired software component from the list of the software components accumulated in the server 20, acquires the selected software component and authentication information from the server, and controls the processing operation of the software components based on the acquired authentication information. Therefore, the execution operation of the software component acquired based on the user's intention can be changed according to the result of authentication.

Although the case where the present invention is applied to the multifunction machine has been explained in this embodiment, this invention is not limited to this case, but can be applied to any other image formation apparatuses.

According to the image formation system as one aspect of this invention, the image formation apparatus selects a desired software component from a list of software components accumulated in the server displayed on the display section, acquires the selected software component and authentication information from the server, and controls the processing operation of the software component based on the acquired authentication information. Thus, there is an advantageous effect that it is possible to obtain the image formation system capable of changing the execution operation of the software component acquired based on the user's intention according to the result of authentication.

Further, the range of resources available for software components, of the resources provided in the image formation apparatus, is restricted based on the authentication information. Therefore, it is possible to restrict the operation of the software component acquired from a server whose authentication has failed. Thus, there is an advantageous effect that it is possible to obtain the image formation system in which the user can avoid execution of malicious software and the machine development vendor can obtain value in exchange for authentication given to the third vendor.

Further, when the authentication based on the authentication information has failed, it is so controlled that the display section and the operation panel section of the resources become available for the software component and all the resources become available for the software component when the authentication based on the authentication information has succeeded. Therefore, when the authentication has failed, the resources except the minimum required resources can be prevented from being used. Thus, there is an advantageous effect that it is possible to obtain the image formation system capable of avoiding such a situation that the user wastes a large amount of paper by using the printing function or the like because of malicious software.

Further, the authentication information includes information related to using rights of the respective resources by the software components, and it is decided whether the software components can use the resources based on the information related to the using rights. Thus, there is an advantageous effect that it is possible to obtain the image formation system capable of deciding quickly and efficiently whether the resources can be used.

Further, the image formation apparatus transmits configuration information for its own apparatus to the server when the authentication based on the authentication information has succeeded. The server dynamically organizes software components executable on the image formation apparatus based on the configuration information received from the image formation apparatus, and sends the organized software components back to the image formation apparatus. Thus, there is an advantageous effect that it is possible to obtain the image formation system capable of acquiring the optimal software components that are adequate for the software configuration or the hardware configuration of the image formation apparatus when the authentication has succeeded.

Further, the image formation apparatus transmits its own identification information to the server. The server identifies configuration information and/or a contract form of the image formation apparatus based on the identification information received from the image formation apparatus, dynamically organizes software components executable on the image formation apparatus based on the identified configuration information and/or contract form, and sends the organized software components back to the image formation apparatus. Thus, there is an advantageous effect that it is possible to obtain the image formation system capable of acquiring the optimal software components that are adequate for the software configuration, hardware configuration, or the contract form of the image formation apparatus.

Further, the server is a WWW server functioning on the Internet, and the image formation apparatus provides a browser with which pages described in HTML are browsed. Thus, there is an advantageous effect that it is possible to obtain the image formation system in which the image formation apparatus and the server can communicate according to the HTTP protocol and the cost of server development can be largely reduced by using the open standard such as WWW.

Further, the acquired software component operates as a plug-in for the browser. Thus, there is an advantageous effect that it is possible to obtain the image formation system capable of executing easily and quickly the software component.

Further, the image formation apparatus establishes a virtual machine such as an applet written in the JAVA programming language that can execute CPU-independent intermediate code, and the virtual machine executes the software components accumulated in the server in the form of the intermediate code. Thus, there is an advantageous effect that it is possible to obtain the image formation system capable of executing the same software component in various types of image formation apparatuses and of developing a software component while the component is simulated on a PC in the developing stage.

Further, when a third vendor registers a software component to the server, the third vendor pays a registration fee to a vendor that manages the server. Thus, there is an advantageous effect that it is possible to obtain the image formation system capable of registering the software component by the third vendor without bringing a disadvantage to the original vendor.

Further, the server charges the vendor for an advertisement fee of a software component each time the image formation apparatus acquires the software component from the server. Thus, there is an advantageous effect that it is possible to obtain the image formation system capable of guaranteeing fair treatment to both the vendor that has developed the software component and the original vendor.

Further, when a server of a third vendor is registered to the image formation apparatus as a server allowed to be authenticated, the third vendor pays a registration fee. Thus, there is an advantageous effect that it is possible to obtain the image formation system capable of allocating an appropriate load to the third vendor.

Further, a using charge of the image formation apparatus and/or a registration fee paid by a third vendor is changed according to a range of the resources available for the image formation apparatus. Thus, there is an advantageous effect that it is possible to obtain the image formation system capable of collecting an appropriate using charge and/or registration fee according to the available range of the resources.

According to the software acquisition method as another aspect of this invention, the image formation apparatus selects a desired software component from a list of software components accumulated in a server displayed on a display section, acquires the selected software component and authentication information from the server, and controls the processing operation of the software component based on the acquired authentication information. Thus, there is an advantageous effect that it is possible to obtain the software acquisition method capable of changing the execution operation of the software component acquired based on the user's intention according to the result of authentication.

Further, the range of resources available for software components, of the resources provided in the image formation apparatus, is restricted based on the authentication information. Therefore, it is possible to restrict the operation of the software component from a server whose authentication has failed. Thus, there is an advantageous effect that it is possible to obtain the software acquisition method in which the user can avoid execution of malicious software and the machine development vendor can obtain value in exchange for authentication given to the third vendor.

Further, when authentication based on the authentication information has failed, it is so controlled that the display section and the operation panel section of the resources become available for the software components and all the resources become available for the software components when the authentication based on the authentication information has succeeded. Therefore, when the authentication has failed, the resources except the minimum required resources can be prevented from being used. Thus, there is an advantageous effect that it is possible to obtain the software acquisition method capable of avoiding such a situation that the user wastes a large amount of paper by using the printing function or the like because of malicious software.

Further, the authentication information includes information related to using rights of the respective resources by the software components, and it is decided whether the software components can use the resources based on the information related to the using rights. Thus, there is an advantageous effect that it is possible to obtain the software acquisition method capable of deciding quickly and efficiently whether the resources can be used.

Further, the image formation apparatus transmits configuration information for its own apparatus to the server when the authentication based on the authentication information has succeeded. The server dynamically organizes software components executable on the image formation apparatus based on the configuration information received from the image formation apparatus, and sends the organized software components back to the image formation apparatus. Thus, there is an advantageous effect that it is possible to obtain the software acquisition method capable of acquiring the optimal software components that are adequate for the software configuration or the hardware configuration of the image formation apparatus when the authentication has succeeded.

Further, the image formation apparatus transmits its own identification information to the server. The server identifies configuration information and/or a contract form of the image formation apparatus based on the identification information received from the image formation apparatus, dynamically organizes software components executable on the image formation apparatus based on the identified configuration information and/or contract form, and sends the organized software components back to the image formation apparatus. Thus, there is an advantageous effect that it is possible to obtain the software acquisition method capable of acquiring the optimal software components that are adequate for the software configuration, hardware configuration, or the contract form of the image formation apparatus.

Further, the server is a WWW server functioning on the Internet, and the image formation apparatus provides a browser with which pages described in HTML are browsed. Thus, there is an advantageous effect that it is possible to obtain the software acquisition method in which the image formation apparatus and the server can communicate according to the HTTP protocol and the cost of server development can be largely reduced by using the open standard such as WWW.

Further, the acquired software component operates as a plug-in for the browser. Thus, there is an advantageous effect that it is possible to obtain the software acquisition method capable of executing easily and quickly the software component.

Further, the image formation apparatus establishes a virtual machine such as an applet written in the JAVA programming language that can execute CPU-independent intermediate code, and the virtual machine executes the software components accumulated in the server in the form of the intermediate code. Thus, there is an advantageous effect that it is possible to obtain the software acquisition method capable of executing the same software component in various types of image formation apparatuses and of developing a software component while the component is simulated on a PC in the developing stage.

Further, when a third vendor registers a software component to the server, the third vendor pays a registration fee to a vendor that manages the server. Thus, there is an advantageous effect that it is possible to obtain the software acquisition method capable of registering the software component by the third vendor without bringing a disadvantage to the original vendor.

Further, the server charges the vendor for an advertisement fee of a software component each time the image formation apparatus acquires the software component from the server. Thus, there is an advantageous effect that it is possible to obtain the software acquisition method capable of guaranteeing fair treatment to both the vendor that has developed the software component and the original vendor.

Further, when a server of a third vendor is registered to the image formation apparatus as a server allowed to be authenticated, the third vendor pays a registration fee. Thus, there is an advantageous effect that it is possible to obtain the software acquisition method capable of allocating an appropriate load to the third vendor.

Further, a using charge of the image formation apparatus and/or a registration fee paid by a third vendor is changed according to a range of the resources available for the image formation apparatus. Thus, there is an advantageous effect that it is possible to obtain the software acquisition method capable of collecting an appropriate using charge and/or registration fee according to the available range of the resources.

According to the recording medium as still another aspect of this invention, by recording the program for making a computer execute one of the methods according to this invention in the recording medium, the program becomes machine readable. Accordingly, there is an advantageous effect that it is possible to obtain the recording medium capable of performing one of the operations according to the invention by the computer.

The present document incorporates by reference the entire contents of Japanese priority documents, 2001-094342 filed in Japan on Mar. 28, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation system comprising:
   an image formation apparatus connected to a network, said image formation apparatus having one or more hardware resources of a display section, an operation panel section, a printing section, and an image pickup section, wherein said image formation apparatus is capable of providing one or more services of a printer, a copier, or a facsimile; and
   a server connected to the network, said server providing a software component to said image formation apparatus via said network,
   wherein said image formation apparatus includes:
      a selection unit that selects a desired software component from a list of software components accumulated in said server and displayed on said display section;
      an acquisition unit that acquires the software component selected by said selection unit and authentication information from said server; and
      a control unit that controls processing operation of the software component acquired by said acquisition unit based on the authentication information acquired by said acquisition unit, wherein
      said control unit restricts the hardware resources available in said image formation apparatus for the acquired software component based on the authentication information, and
      when authentication based on the authentication information has failed, said control unit specifies minimum resources so that said display section and operation panel section of the resources become available for the software components, and when the authentication based on the authentication information has succeeded, said control unit specifies that all the resources are available for the software components.

2. The image formation system according to claim 1, wherein the authentication information includes information related to rights for using the respective resources by the software components, and said control unit decides whether the software components can use the resources based on the information related to using rights.

3. The image formation system according to claim 1, wherein said image formation apparatus further comprises:
   a transmission unit that transmits configuration information for said image formation apparatus to said server when succeeding in authentication based on the authentication information, and
   said server organizes software components executable on said image formation apparatus based on the configuration information received from said image formation apparatus, and sends the organized software components back to said image formation apparatus.

4. The image formation system according to claim 3, wherein
   said transmission unit transmits identification information for identifying said image formation apparatus to said server, and
   said server identifies one or more of configuration information and a contract form of said image formation apparatus based on the identification information received from said image formation apparatus, organizes software components executable on said image formation apparatus based on the identified configuration information or contract form, and sends the organized software components back to said image formation apparatus.

5. The image formation system according to claim 1, wherein said server is a WWW server functioning on the Internet, and
   said image formation apparatus further provides a browser with which pages described in HTML are browsed.

6. The image formation system according to claim 5, wherein the software component acquired by said acquisition unit operates as a plug-in for said browser.

7. The image formation system according to claim 5, wherein said image formation apparatus further establishes a virtual machine that can execute CPU-independent intermediate code, and the virtual machine executes the software components accumulated in said server in a form of intermediate code.

8. The image formation system according to claim 1, wherein, one vendor manages said server, and another vendor can register a software component to said server by paying a particular registration fee to the vendor that manages the server.

9. The image formation system according to claim 8, wherein the vendor is charged for an advertisement fee of a software component each time said image formation apparatus acquires the software component from said server.

10. The image formation system according to claim 9, wherein a server of the third-party vendor can be registered with said image formation apparatus as a server allowed to be authenticated when the third-party pays a particular registration fee.

11. The image formation system according to claim 10, wherein one or more of a charge for using said image formation apparatus and the registration fee paid by the third-party vendor is changed according to a range of resources available for said image formation apparatus.

12. A software acquisition method comprising:
   connecting an image formation apparatus and a server to a network, said image formation apparatus having one or more hardware resources of a display section, an operation panel section, a printing section, and an image pickup section;
   providing one or more of services of a printer, a copier, or a facsimile;

providing a software component to said image formation apparatus from said server, wherein said image formation apparatus performs steps of:

selecting a desired software component from a list of software components accumulated in said server and displayed on said display section;

acquiring the selected software component and authentication information from said server; and controlling a processing operation of the acquired software component based on the acquired authentication information, wherein the controlling step restricts the hardware resources available in said image formation apparatus for the acquired software component based on the authentication information, and when authentication based on the authentication information has failed, the controlling step specifies minimum resources so that said display section and operation panel section of the resources become available for the software components, and when authentication based on the authentication information has succeeded, said controlling step specifies that all the resources are available for the software components.

13. The software acquisition method according to claim 12, wherein the authentication information includes information related to rights for using the respective resources by the software components, and the controlling step decides whether the software components can use the resources based on the information related to the using rights.

14. The software acquisition method according claim 12, further comprising:

transmitting configuration information for said image formation apparatus to said server when said image formation apparatus has succeeded in authentication based on the authentication information, wherein said server organizes software components executable on said image formation apparatus based on the configuration information received from said image formation apparatus, and sends the organized software components back to said image formation apparatus.

15. The software acquisition method according to claim 14, wherein in the transmitting step, identification information for identifying said image formation apparatus is transmitted to said server, and said server identifies one or more of configuration information and a contract form of said image formation apparatus based on the identification information received from said image formation apparatus, organizes software components executable on said image formation apparatus based on the identified configuration information and/or contract form, and sends the organized software components back to said image formation apparatus.

16. The software acquisition method according to claim 12, wherein said server is a WWW server functioning on the Internet, and said image formation apparatus has a browser with which pages described in HTML are browsed.

17. The software acquisition method according to claim 16, wherein the software component acquired in the acquiring step operates as a plug-in for said browser.

18. The software acquisition method according to claim 16, wherein said image formation apparatus has a virtual machine that can execute CPU-independent intermediate code, and the virtual machine executes the software components accumulated in said server in a form of intermediate code.

19. The software acquisition method according to claim 12, wherein, one vendor manages said server, and another vendor can register a software component to said server by paying a particular registration fee to the vendor that manages the server.

20. The software acquisition method according to claim 19, wherein the vendor is charged for an advertisement fee of a software component each time said image formation apparatus acquires the software component from said server.

21. The software acquisition method according to claim 20, wherein a server of the third-party vendor can be registered with said image formation apparatus as a server allowed to be authenticated when the third-party pays a particular registration fee.

22. The software acquisition method according to claim 21, wherein one or more of a charge for using said image formation apparatus and the registration fee paid by the third-party vendor is changed according to a range of resources available for said image formation apparatus.

23. A computer readable recording medium for storing instructions, which when executed on a computer, causes the computer to realize a software acquisition method in an image formation system which connects an image formation apparatus and a server to a network, said image formation apparatus having one or more hardware resources of a display section, an operation panel section, a printing section, and an image pickup section and for providing one or more of services of a printer, a copier, or a facsimile, and said server providing a software component to said image formation apparatus, wherein said image formation apparatus performs steps of:

selecting a desired software component from a list of software components accumulated in said server and displayed on said display section;

acquiring the selected software component and authentication information from said server; and controlling a processing operation of the acquired software component based on the acquired authentication information, wherein the controlling step restricts the hardware resources available in said image formation apparatus for the acquired software component based on the authentication information, and when authentication based on the authentication information has failed, the controlling step specifies minimum resources so that said display section and operation panel section of the resources become available for the software components, and when authentication based on the authentication information has succeeded, said controlling step specifies that all the resources are available for the software components.

24. A computer program embodied in a computer readable medium for causing a computer to realize a software acquisition method in an image formation system which connects an image formation apparatus and a server to a network, said image formation apparatus having one or more hardware resources of a display section, an operation panel section, a printing section, and an image pickup section and for providing one or more of services of a printer, a copier, or a facsimile, and said server providing a software component to said image formation apparatus, wherein said image formation apparatus performs steps of:

selecting a desired software component from a list of software components accumulated in said server and displayed on said display section;

acquiring the selected software component and authentication information from said server; and controlling a processing operation of the acquired software component based on the acquired authentication information, wherein the controlling step restricts the hardware resources available in said image formation apparatus for the acquired software component based on the authentication information, and when authentication based on the authentication information has failed, the controlling step specifies minimum resources so that said display section and operation panel section of the resources become available for the software components, and when authentication based on the authentication information has succeeded, said controlling step specifies that all the resources are available for the software components.

* * * * *